United States Patent
Graham et al.

(10) Patent No.: US 10,867,273 B2
(45) Date of Patent: Dec. 15, 2020

(54) INTERFACE FOR EXPANDING LOGICAL COMBINATIONS BASED ON RELATIVE PLACEMENT

(71) Applicant: ORACLE INTERNATIONAL CORPORATION, Redwood Shores, CA (US)

(72) Inventors: Angus Graham, Redwood Shores, CA (US); Celine Beck, Redwood Shores, CA (US); Artashes Gamarian, Redwood Shores, CA (US); Thierry Bonfante, Redwood Shores, CA (US); Jeremy Ashley, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 838 days.

(21) Appl. No.: 14/604,638

(22) Filed: Jan. 23, 2015

(65) Prior Publication Data

US 2016/0092817 A1 Mar. 31, 2016

Related U.S. Application Data

(60) Provisional application No. 62/056,319, filed on Sep. 26, 2014.

(51) Int. Cl.
*G06Q 10/06* (2012.01)
*G06F 8/34* (2018.01)
*G06F 3/0482* (2013.01)

(52) U.S. Cl.
CPC ........ *G06Q 10/067* (2013.01); *G06F 3/0482* (2013.01); *G06F 8/34* (2013.01); *G06Q 10/06316* (2013.01)

(58) Field of Classification Search
CPC .............. G06F 17/30389; G06F 8/34
(Continued)

(56) References Cited

U.S. PATENT DOCUMENTS 5,287,439 A * 2/1994 Koga ............... G06T 11/60
345/440
5,481,668 A * 1/1996 Marcus ............... G06F 8/34
715/853
(Continued)

FOREIGN PATENT DOCUMENTS

GB 2500681 A * 10/2013 ............ G06F 9/5011

OTHER PUBLICATIONS

"Using Process Builder (Beta)" Salesforce.com, Winter'15. Sep. 17, 2014 https://help.salesforce.com/servlet/servlet.FileDownload?file=0153000000365jAAAQ (Year: 2014).*
(Continued)

*Primary Examiner* — Christine M Behncke
*Assistant Examiner* — Shelby A Turner
(74) *Attorney, Agent, or Firm* — Hickman Palermo Becker Bingham LLP

(57) ABSTRACT

A method, apparatus, and system for an interface for expanding logical combinations based on relative placement are provided. Logical combinations are built using a consistent logical layout specifying logical operators and order of operations based on direction of expansion and relative positions. The interface allows the user to add or move objects at specific positions relative to existing objects to select the logical operators for integrating the objects into the logical combination. Based on the specific pathway that the direction follows, an associated logical operator is selected to connect an existing object to the new or moved object. The logical combinations that are built in Visual Information Builder (VIB) can be automatically translated
(Continued)

into corresponding business rule code for evaluation and execution by a rules engine.

14 Claims, 14 Drawing Sheets

(58) Field of Classification Search
USPC ......... 715/763, 764, 769; 717/105, 109, 113
See application file for complete search history.

(56) References Cited

U.S. PATENT DOCUMENTS

| | | | | |
|---|---|---|---|---|
| 5,842,203 | A * | 11/1998 | D'Elena | G06F 16/2428 |
| 5,892,948 | A * | 4/1999 | Aoki | G06F 8/34 |
| | | | | 717/105 |
| 6,948,173 | B1 * | 9/2005 | Isom | G06F 9/4806 |
| | | | | 718/100 |
| 7,168,077 | B2 * | 1/2007 | Kim | G06Q 10/10 |
| | | | | 718/106 |
| 7,289,966 | B2 * | 10/2007 | Ouchi | G06Q 10/06311 |
| | | | | 705/7.13 |
| 7,474,310 | B2 * | 1/2009 | Albertson | G06F 8/34 |
| | | | | 345/440 |
| 7,610,308 | B1 * | 10/2009 | Chiu | G06F 16/2428 |
| 7,805,327 | B1 * | 9/2010 | Schulz | G06Q 10/06316 |
| | | | | 705/7.26 |
| 8,887,076 | B2 * | 11/2014 | Frohliger | G06F 3/048 |
| | | | | 715/764 |
| 9,069,559 | B2 * | 6/2015 | Limburn | G06F 8/35 |
| 2001/0044738 | A1 * | 11/2001 | Elkin | G06Q 10/06316 |
| | | | | 705/7.15 |
| 2002/0040312 | A1 * | 4/2002 | Dhar | G06Q 40/025 |
| | | | | 705/7.26 |
| 2002/0049715 | A1 * | 4/2002 | Serrano-Morales | G06N 5/022 |
| 2002/0138543 | A1 * | 9/2002 | Teng | G06F 21/6218 |
| | | | | 718/102 |
| 2005/0022115 | A1 | 1/2005 | Baumgartner | |
| 2005/0022198 | A1 * | 1/2005 | Olapurath | G06F 8/34 |
| | | | | 718/102 |
| 2006/0074731 | A1 * | 4/2006 | Green | G06Q 10/0633 |
| | | | | 705/7.27 |
| 2006/0200476 | A1 * | 9/2006 | Gottumukkala | G06F 16/5854 |
| 2007/0055558 | A1 * | 3/2007 | Shanahan | G06Q 10/06316 |
| | | | | 705/7.26 |
| 2008/0034303 | A1 * | 2/2008 | Evans | G06F 8/34 |
| | | | | 715/763 |
| 2008/0065448 | A1 * | 3/2008 | Hull | G06Q 10/06316 |
| | | | | 705/7.26 |
| 2011/0119286 | A1 * | 5/2011 | McGuire | G06F 40/18 |
| | | | | 707/767 |
| 2011/0145738 | A1 * | 6/2011 | Laugwitz | G06F 3/0482 |
| | | | | 715/763 |
| 2011/0185315 | A1 * | 7/2011 | Armour | G06F 8/34 |
| | | | | 715/853 |
| 2012/0210265 | A1 * | 8/2012 | Delia | G06F 3/0482 |
| | | | | 715/771 |
| 2012/0254832 | A1 * | 10/2012 | Aman | G06F 8/34 |
| | | | | 717/109 |
| 2013/0253977 | A1 * | 9/2013 | Vibhor | H04L 47/70 |
| | | | | 705/7.26 |
| 2014/0032606 | A1 * | 1/2014 | Chandler | G06F 8/34 |
| | | | | 707/798 |
| 2014/0053070 | A1 | 2/2014 | Powers | |
| 2015/0095094 | A1 * | 4/2015 | Chan | G06Q 10/06316 |
| | | | | 705/7.26 |
| 2015/0095097 | A1 * | 4/2015 | DeJardine | G06Q 10/0633 |
| | | | | 705/7.27 |
| 2015/0142501 | A1 * | 5/2015 | Nair | G06Q 10/06316 |
| | | | | 705/7.26 |
| 2015/0193210 | A1 | 7/2015 | Rivas | |
| 2015/0206079 | A1 * | 7/2015 | Sanabria | G06Q 10/06316 |
| | | | | 705/7.27 |
| 2016/0092778 | A1 | 3/2016 | Graham et al. | |

OTHER PUBLICATIONS

"How to Create Separate Sub-process Diagram from Existing Process Model" Visual Paradigm, Youtube.com, 2013, https://www.youtube.com/watch?v=kVdN3bnu6Mg. (Year: 2013).*

U.S. Appl. No. 14/604,637, filed Jan. 23, 2015, Notice of Allowance, dated Sep. 9, 2016.

* cited by examiner

FIG. 3A

302
RECEIVE A REQUEST TO LAUNCH A VISUAL INFORMATION BUILDER FOR A SPECIFIC TASK OF AN APPLICATION THAT USES A BUSINESS RULE ENGINE

304
ACCESS A STORED RULE MODEL OF TWO OR MORE DIFFERENT CANDIDATE RULE MODELS, WHEREIN THE RULE MODEL COMPRISES A PLURALITY OF OBJECTS COMPRISING CONDITIONS AND ACTIONS, RETRIEVED FROM A RULE DICTIONARY OF THE BUSINESS RULE ENGINE, THAT ARE BASED ON THE SPECIFIC TASK, WHEREIN A PARTICULAR OBJECT OF THE PLURALITY OF OBJECTS IS ASSOCIATED WITH A TEMPLATE DEFINING ONE OR MORE OPTIONS, FOR THE PARTICULAR OBJECT, THAT ARE BASED ON THE SPECIFIC TASK

306
PRESENT A USER INTERFACE OF THE VISUAL INFORMATION BUILDER TO ARRANGE A LOGICAL COMBINATION OF OBJECTS THAT ARE SELECTED FROM THE RULE MODEL, WHEREIN THE PARTICULAR OBJECT IS EDITABLE IN THE USER INTERFACE ACCORDING TO THE TEMPLATE

308
CONVERT THE LOGICAL COMBINATION INTO ONE OR MORE BUSINESS RULES EVALUABLE BY THE BUSINESS RULE ENGINE

310
STORE THE ONE OR MORE BUSINESS RULES IN THE RULE DICTIONARY

INTERFACE FOR EXPANDING LOGICAL COMBINATIONS BASED ON RELATIVE PLACEMENT

CROSS-REFERENCE TO RELATED APPLICATIONS; BENEFIT CLAIM

This application claims the benefit of U.S. Provisional Application No. 62/056,319, filed Sep. 26, 2014, which is hereby incorporated by reference in its entirety as if fully set forth herein.

FIELD OF THE INVENTION

The present disclosure relates to business rules, and more specifically, to providing a graphical user interface for building and managing business rules.

BACKGROUND

Business rules help to define the structure, constraints, policies, and other aspects of a business or organization. As the size of the business grows, it becomes more important to efficiently enforce the business rules across the various services, products, personnel, and other organizational units within the business. Accordingly, many businesses rely on an integrated platform, such as service oriented architecture (SOA), system as a service (SaaS), cloud computing, or another platform that allows the business rules to be modularly integrated into applications that carry out the functions and daily operations of the business. By separating the definition of the business rules from the applications that utilize the business rules, businesses can add or modify business rules to remain agile in the face of evolving legal and regulatory requirements, labor conditions, marketplace trends, and other criteria.

To manage business rules in these platforms, the user either directly edits the code that defines the business rule, or uses a graphical rule editor, similar to an integrated development environment (IDE), that allows the business rule to be edited at the code level. However, even with the availability of browse and search functions in the rule editor, the sheer number and types of data sources, conditions, actions, and other criteria for defining a business rule may leave the user at a loss on how to actually define a new business rule or modify an existing business rule. As the business application grows in complexity and scope, the usability of the rule editor may suffer, particularly if the user is not intimately familiar with the organization of the rule dictionaries or the code level details for implementing the business rules within the integrated platform. As such, integrated platform deployments may not be leveraged to their fullest potential.

Based on the foregoing, there is a need for a method to provide facilitated business rule authoring and management.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A is a flow diagram that depicts a process for building business rules using a visual information builder, according to an embodiment;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, Visual Information Builder (VIB), a user interface for building and managing business rules, is provided. By providing an additional interface layer over a general purpose business rule creation interface, role-based and context-sensitive interaction and presentation can be provided to abstract the complexity of the underlying service platform that supports the business rules. The relevant rule dictionary, APIs, add-ons and other data sources and interfaces are automatically selected according to metadata for the context or task flow region of the uptaking business application, with the metadata further defining user friendly rule editing templates that are passed onto VIB.

In aggregate, the available templates for a given context define the scope of possible actions and objects when building a business rule, wherein the objects may include business attributes and functions. Individually, the templates expose only the relevant information for a given context, with (1) rules templates limiting the number and type of actions available when building a business rule, (2) rules condition templates defining the possible options for building conditions (IF clauses), and (3) rules action templates defining the possible options for building actions (DO clauses).

While the templates are customized for particular contexts and objects, the general rule building process is uniformly consistent across different contexts and operates similarly at the block and rule scale. In this manner, additional metadata that is stored for the business application enables VIB to provide a business rule editing interface that is user friendly, intuitive and consistent. Moreover, logical combinations are built using a consistent logical layout specifying logical operators and order of operations based on direction of expansion and relative positions. As used herein, the term "logical operator" refers to any logic for combining two targets or sets of targets. Example targets of logical operators include, but are not limited to, actions, conditions, objects comprising a combination of conditions and/or actions, and items referenced by conditions and/or actions. The logical combinations that are built in VIB can be automatically translated into corresponding business rule code for evaluation and execution by a rules engine.

System Overview

Figure 1:
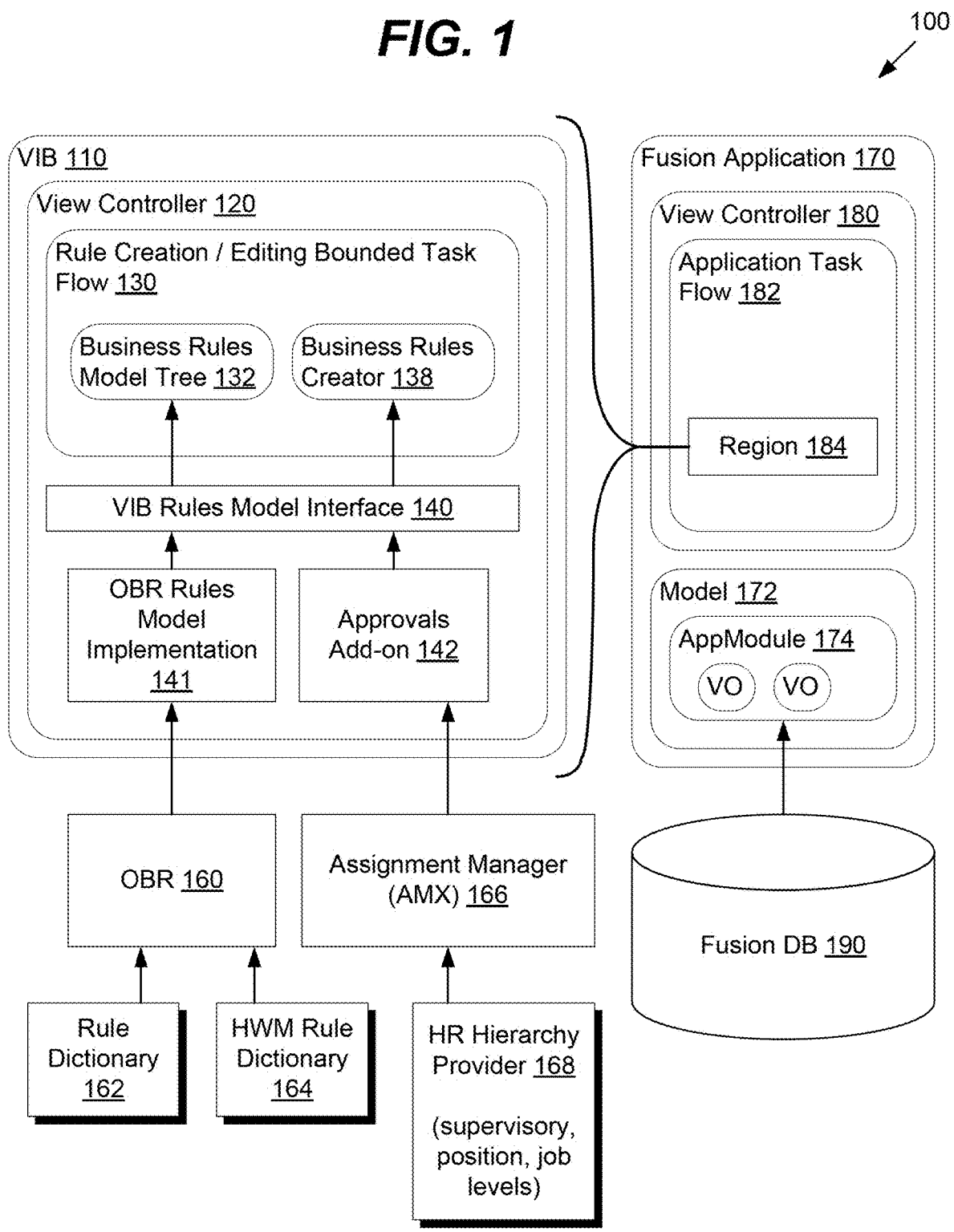
FIG. 1 is a block diagram that depicts an example system integrating a visual information builder for business rules, according to an embodiment.

FIG. 1 is a block diagram that depicts an example system architecture that integrates VIB. System 100 of FIG. 1 includes Visual Information Builder (VIB) 110, Oracle Business Rules (OBR) 160, rule dictionary 162, Human Workflow Management (HWM) rule dictionary 164, Assignment Manager (AMX) 166, Human Resources (HR) Hierarchy Provider 168, Fusion application 170, and Fusion database (DB) 190. VIB 110 includes view controller 120. View controller 120 includes rule creation / editing bounded task flow 130, VIB rules model interface 140, OBR rules model implementation 141, and approvals add-on 142. Fusion application 170 includes view controller 180 and model 172. View controller 180 includes application task flow 182. Application task flow 182 includes region 184. Model 172 includes AppModule 174.

The example shown in FIG. 1 utilizes the Oracle Fusion Middleware framework, including Oracle Business Rules (OBR), as described in "Designing Business Rules with Oracle Business Process Management", available at http://docs.oracle.com/middleware/1213/bpm/rules-user/title.htm#BEGIN, the entire contents of which is hereby incorporated by reference as if fully set forth herein. However, any suitable SOA, SaaS, or other architecture may be utilized that allows business rules to be modularly defined and implemented for an integrated platform.

As shown in FIG. 1, a business application of interest, or Fusion application 170, may provide its own user interface that is rendered by view controller 180. Within view controller 180, an application task flow 182 is shown, which may describe all of the various task flows for fusion application 170. For example, application task flow 182 may include flows for all of the operations of an online commerce business including customer facing storefronts, order management, human resources management, and other areas. The tasks in application task flow 182 may utilize a database, or Fusion DB 190, which is accessed through a data model provided in model 172. Model 172 includes AppModule 174, which defines the data model for fusion application 170. More specifically, view objects (VO) in AppModule 174 are defined to access the relevant portions of Fusion DB 190 that are used by Fusion application 170.

Context Driven User Interface

To modify the task flows defined for a given aspect of fusion application 170, a user may select a specific task portion, or region 184, for editing or building with VIB 110. Thus, as shown in FIG. 1, VIB 110 may be opened in the context of region 184 within application task flow 182 of fusion application 170. VIB 110 includes its own user interface, or view controller 120. Depending on the context metadata specified for region 184, which may be stored as part of fusion application 170 and passed onto VIB 110, one or more interfaces or APIs may be utilized to retrieve the necessary information to model the business rules for region 184.

For example, if region 184 is concerned with order management, then the metadata for region 184 may indicate the correct rule dictionary 162 and/or human workflow management (HWM) rule dictionary 164 to utilize with OBR 160. Thus, facts and functions from standard dictionaries, or rule dictionary 162, and human workflow management dictionaries, or HWM rule dictionary 164, are both supported. VIB 110 includes its own specific interface for OBR 160, or OBR rules model implementation 141, which then feeds into a unified interface for modelling the business rules, or VIB rules model interface 140. Thus, the business attributes, functions, and actions that are presented in view controller 120 are based on the context of region 184. For example, if region 184 corresponds to an order management pre-transformation setup page, then only information related to the pre-transformation task will be shown in view controller 120.

As another example, if region 184 is concerned with business procurement and financials including business expense reports, then the metadata for region 184 may indicate the correct rule dictionary 162 and/or the correct HWM rule dictionary 164 as above, but additionally specify that human resources (HR) hierarchy provider 168 needs to be consulted via assignment manager (AMX, or approval management extensions) 166 to lookup the various human resources hierarchies and employee roles. VIB 110 includes its own specific interface for AMX 166, or approvals add-on 142, which feeds into the unified interface VIB rules model interface 140. Thus, as shown in FIG. 1, VIB 110 can tap into numerous different APIs and interfaces to access various internal and external data providers and rule evaluation engines according to metadata for region 184.

Once all of the necessary rules, facts and functions, templates, and other data are loaded into VIB rules model interface 140 for the given context, or region 184, then the main rule editing interface, or rules creation/editing bounded task flow 130, can be rendered within view controller 120. As shown in FIG. 1, the two main interface components include business rules model tree 132 and business rules creator 138. Business rules model tree 132 lists the available objects, or conditions and actions, according to the available templates, as defined by the metadata for region 184. Business rules creator 138 allows a user to edit an existing business rule or create a new business rule, which can be automatically translated to code and written into rule dictionary 162 or HWM rule dictionary 164 as appropriate. OBR 160 may evaluate and execute the business rules within rule dictionary 162 and HWM rule dictionary 164 as part of the Fusion middleware framework to support various Fusion applications, including Fusion application 170.

Note that the specific attributes and functions that are exposed in business rules creator 138 may further depend on a specific business object that is selected from business rules model tree 132, and the specific business facts selected for the business object. For example, if a business rule is to be created concerning a participant A, then only attributes and functions that are relevant for participant A may be presented, hiding information for other participants such as participants B and C.

Context Driven Rules Action Templates

Figure 2A:
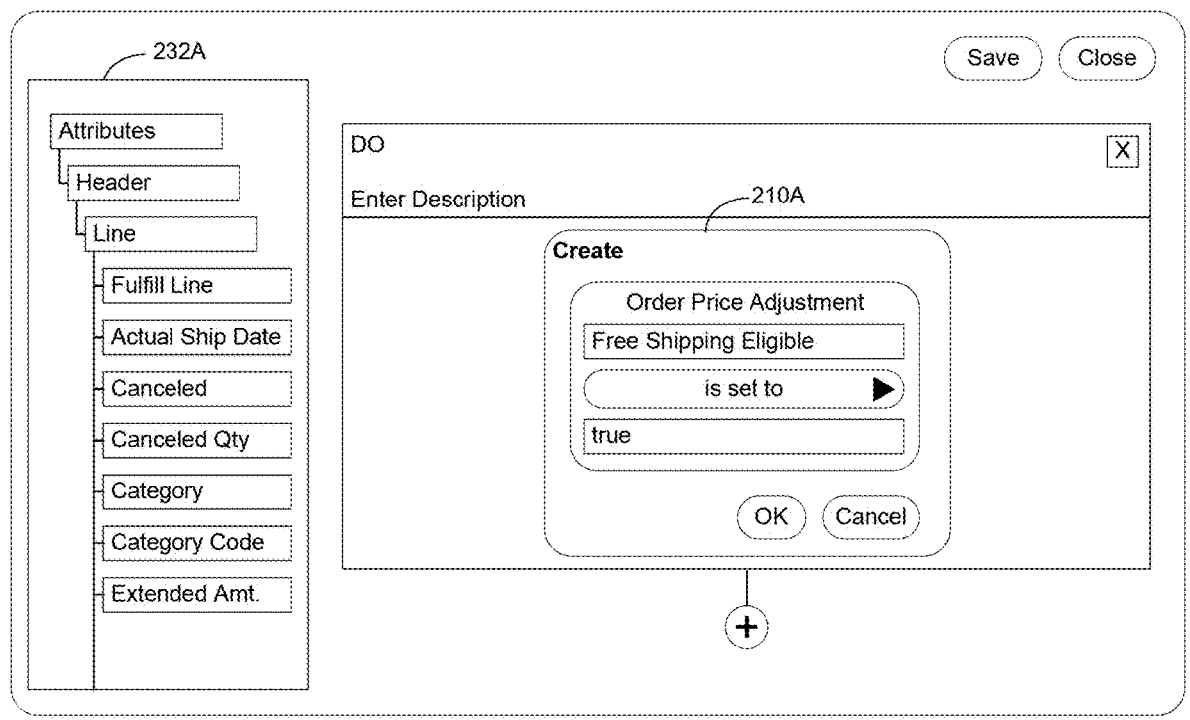
FIG. 2A is a block diagram that depicts an example visual information builder user interface for creating a standard action node by using a rules action template for an order management context, according to an embodiment.
Figure 2B:
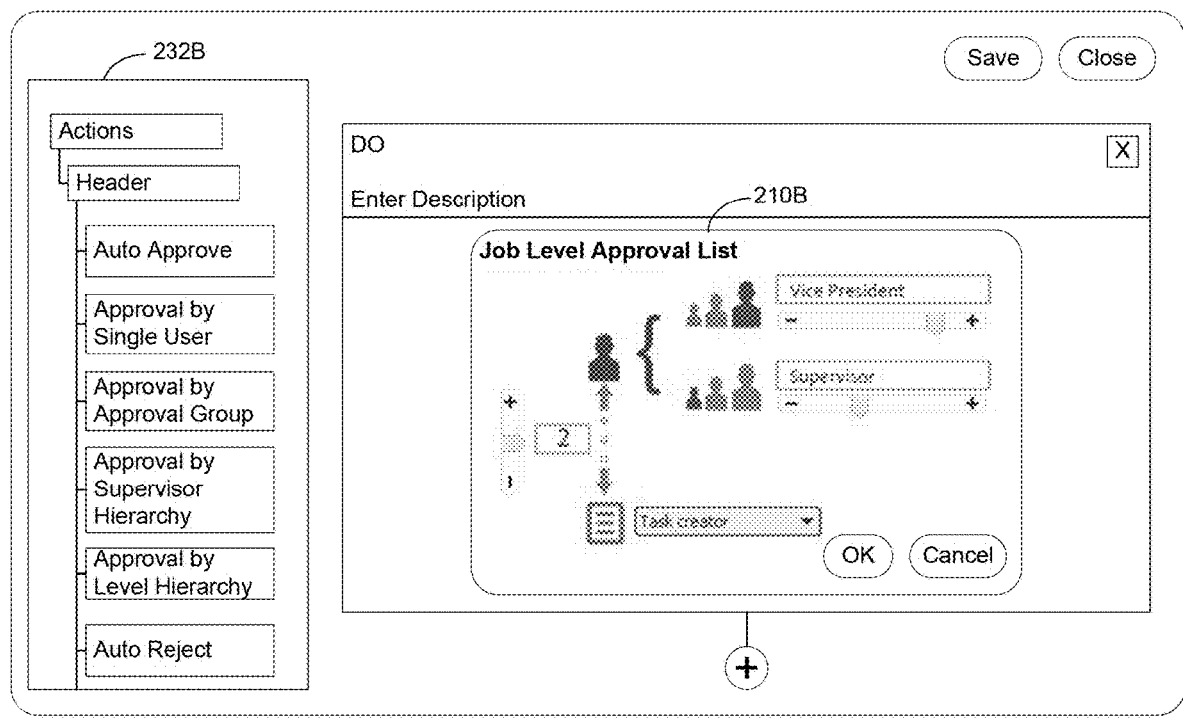
FIG. 2B is a block diagram that depicts an example visual information builder user interface for creating a custom action node by using a rules action template for an approval management context, according to an embodiment.

FIG. 2A and FIG. 2B illustrate two example rules action templates that are presented in two different contexts. FIG. 2A is a block diagram that depicts an example visual information builder user interface for creating a standard action node by using a rules action template for an order management context, according to an embodiment. Accordingly, FIG. 2A may correspond to view controller 120 when region 184 corresponds to order management. FIG. 2A includes template 210A and business rules model tree 232A. With respect to FIG. 2A, business rules model tree 232A may correspond to business rules model tree 132 from FIG. 1.

Standard Rules Action Template

In FIG. 2A, a template 210A is presented to the user after adding an action from business rules model tree 232A. For example, business rules model tree 232A may contain a list of attributes and functions for order management, including the function "Order Price Adjustment", which allows the user to edit various price parameters of an order to be shipped in the order management system. Since these price parameters may not have any particular special considerations that would warrant a customized template layout, template 210A may utilize a standard rules action template with actions in the form of "[fact] [assignment] [value]".

As shown in FIG. 2A, the selected price parameter is "Free Shipping Eligible" ([fact]), which "is equal to" ([condition]) the value of "true" ([value]). Thus, after clicking "OK" in template 210A, an action is generated that makes free shipping eligible for a given order. This action (DO clause) might be combined with a particular condition (IF clause), for example if the order meets a minimum order amount, to define a standard shipping business rule that can be translated into code and evaluated by OBR 160 for various parts of Fusion application 170, including the storefront and the order management systems.

Template 210A may allow the user to type or select from a list of various price parameters, for example "Free Shipping Eligible", "State Taxable", and "Freight Surcharge". Depending on the selected parameter, conditions or assignments, values, and other options that are allowable may change. For example, the above parameters may only accept "is set to" as an assignment, and the values may only correspond to Boolean values, or true and false. The values may also correspond to other data types, such as strings that are typed in or selected from a list. The constraints for allowable actions may be defined as part of the metadata for region 184, and also based on the fact type of the associated facts and the particular template being used.

Since template 210A is a rules action template (DO clause), the phrase "is set to" is an assignment that sets the value of the corresponding parameter. However, if template 210A instead corresponded to a rules condition template (IF clause), then a conditional phrase may be utilized. Thus, whereas standard rules action templates may define actions in the form of "[fact] [assignment] [value]", standard rules condition templates may define conditionals in the form of "[fact] [condition] [value]". Conditions may include "is equal to", "is not equal to", "greater than", "at least", "less than", "not exceeding", "contains", "starts with", "ends with" "similar to", and other conditions.

Custom Rules Action Template

Turning to FIG. 2B, FIG. 2B is a block diagram that depicts an example visual information builder user interface for creating a custom action node by using a rules action template for an approval management context, according to an embodiment. Accordingly, FIG. 2B may correspond to view controller 120 when region 184 corresponds to business procurement and financials. FIG. 2A includes template 210B and business rules model tree 232B. With respect to FIG. 2A, business rules model tree 232B may correspond to business rules model tree 132 from FIG. 1.

In FIG. 2B, a template 210B is presented to the user after adding an action from business rules model tree 232B, which may correspond to business rules model tree 132 from FIG. 1. For example, business rules model tree 232B may contain a list of attributes for expense report approval, including the action "Approval by Level Hierarchy", which specifies the participant levels that will approve or reject a given report task.

Compared to FIG. 2A where template 210A uses a standard rules action template, template 210B of FIG. 2B uses a custom rules action template that is specifically tailored for the given approval management action, or "Approval by Level Hierarchy", to set the required approval levels for a financial report task. Accordingly, template 210B allows the user to specify the levels for approving the report task, or a "Supervisor" at the first higher level and a "Vice President" at the third higher level relative to the "Task creator", or the employee submitting the expense report task. For example, if the "Task creator" is selected to be a "Manager", then the selection of participants in template 210B may exclude any personnel who are below the "Manager" in the hierarchy, as defined by HR Hierarchy Provider 168. Accordingly, template 210B can be further tailored according to the specific hierarchical role of the person that the expense report task pertains to. Thus, the process for creating an approval management rule is highly streamlined via template 210B, avoiding the laborious and error-prone task of creating the approval function manually using rule dictionary 162, wherein many of the exposed parameters may be unclear to the user or irrelevant for the task at hand.

Figure 3B:
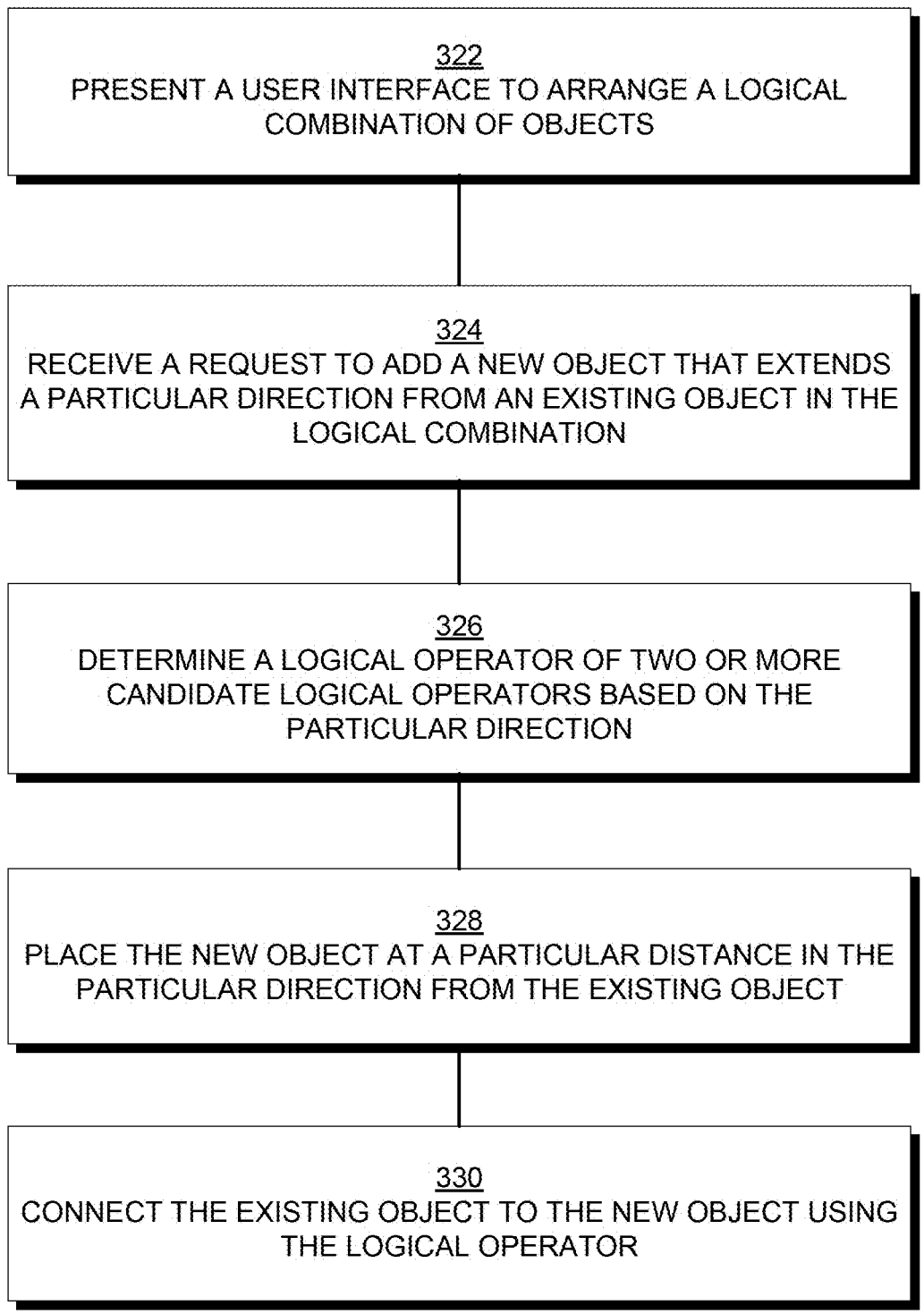
FIG. 3B is a flow diagram that depicts a process for expanding a logical combination based on relative placement, according to an embodiment.

Once the user is satisfied with the required participants and the task creator role in the approval action, the user may click "OK" to create the associated action. Thus, the template is driven by the particular context, which includes 1) the particular task at hand, or the selected region 184 from application task flow 182 of fusion application 170, 2) the particular object that is selected from business rules model tree 232B, and possibly 3) the particular business facts selected for the business object, or the expense task creator for the example shown in template 210B. While the examples shown in FIGS. 2A and 2B pertain specifically to rules action templates for DO clauses, the context driven templates can also apply to rules condition templates for IF clauses. By combining these template DO and IF clauses with ELSE and THEN connectors, a logical combination of objects can be built to represent one or more business rules, as described in conjunction with FIG. 3A below.

Rules Templates for Automatic Adding or Limiting Actions

In the examples discussed above, the user may have selected the specific action from business rules model tree 132. In some cases, it may be preferable to automatically select and pre-populate an action or node when building a business rule for a particular task. For example, if the user selects a condition clause that should always be paired with a specific action clause, then the specific action clause may be automatically added as a new node connected to the condition clause and pre-populated with the correct data, if available. In this case, a rules template may be defined that limits particular business rules to a specific pre-determined action. In other cases, it may be desirable to limit the number of actions available for a particular business rule to only a subset of the available actions for a given context. In this case, a rules template may be defined to filter business rules model tree 132 to display only the allowable actions for a particular business rule. Thus, rules templates can be defined to limit particular business rules to a specific pre-determined action or to a subset of available actions, thereby preventing the user from selecting an invalid action. The rules templates may be defined according to the context of region 184 and possibly the condition(s) selected from business rules model tree 132.

Business Rule Building Process

Having an overview of how the context drives the rules action templates, it may now be instructive to review a process of building a new business rule from start to finish. Turning to FIG. 3A, FIG. 3A is a flow diagram that depicts a process for building business rules using a visual information builder, according to an embodiment.

Receiving a Request to Launch VIB

At block 302 of process 300, referring to FIG. 1, a request is received to launch VIB 110 for region 184 of Fusion application 170 that uses OBR 160. For example, as discussed above, a user may select region 184, corresponding to a specific task of application task flow 182, via a user interface exposed by view controller 180. The user may interact with a user interface element within the user interface, for example a button or a menu item, to indicate a desire to launch VIB 110 for editing or building business rules. Thus, a request to launch VIB 110 may be received for region 184, for example at a client workstation or a server that may correspond to computer system 600 as described in FIG. 6 below. The remaining blocks of process 300 may also be carried out on the same computer system 600.

Accessing a Rule Model Based on the Context Metadata

At block 304 of process 300, referring to FIG. 1, business rules model tree 132 of two or more candidate rule models is accessed, including a plurality of objects comprising conditions and actions retrieved from rule dictionary 162 or HWM rule dictionary 164, based on region 184. As discussed above, there are many factors that can influence the specific plurality of objects that are exposed in business rules model tree 132, which represent the different candidate rule models containing different sets of objects. One factor is the context of the specific task, or region 184 within application task flow 182, such as whether region 184 pertains to order management, financials and procurement, or another aspect of application task flow 182. This specific task may be passed as context to VIB 110 when VIB 110 is launched from view controller 180 of Fusion application 170.

Another factor is the rule dictionary indicated for the specific task, such as rule dictionary 162 or HWM rule dictionary 164, and the specific objects, including attributes and functions (conditions and actions) that are indicated for the rule dictionary. Yet another factor is templates indicated by the specific task including rules templates, rules condition templates, and rules action templates. A particular object of the plurality of objects in business rules model tree 132 is associated with a template that defines one or more options or parameters, based on the specific task, for building the particular object within business rules creator 138. Of course, more than one object may each be associated with one or more templates. In this manner, rather than exposing the entire rule dictionary to the user, the objects exposed in business rules model tree 132 can be limited and tailored to be highly relevant for the specific task at hand using the different candidate rule models.

Presenting a User Interface to Arrange a Logical Combination

At block 306 of process 300, referring to FIG. 1, view controller 120 presents a user interface for VIB 110 to arrange a logical combination of objects that are selected from business rules model tree 132, wherein the particular object (from block 304) is editable in the user interface according to the template (from block 304). Block 306 may be more readily understood by examining FIG. 4A through 4F, which are block diagrams that depict exemplary steps for creating one or more new business rules using VIB 110, according to an embodiment.

Figure 4A:
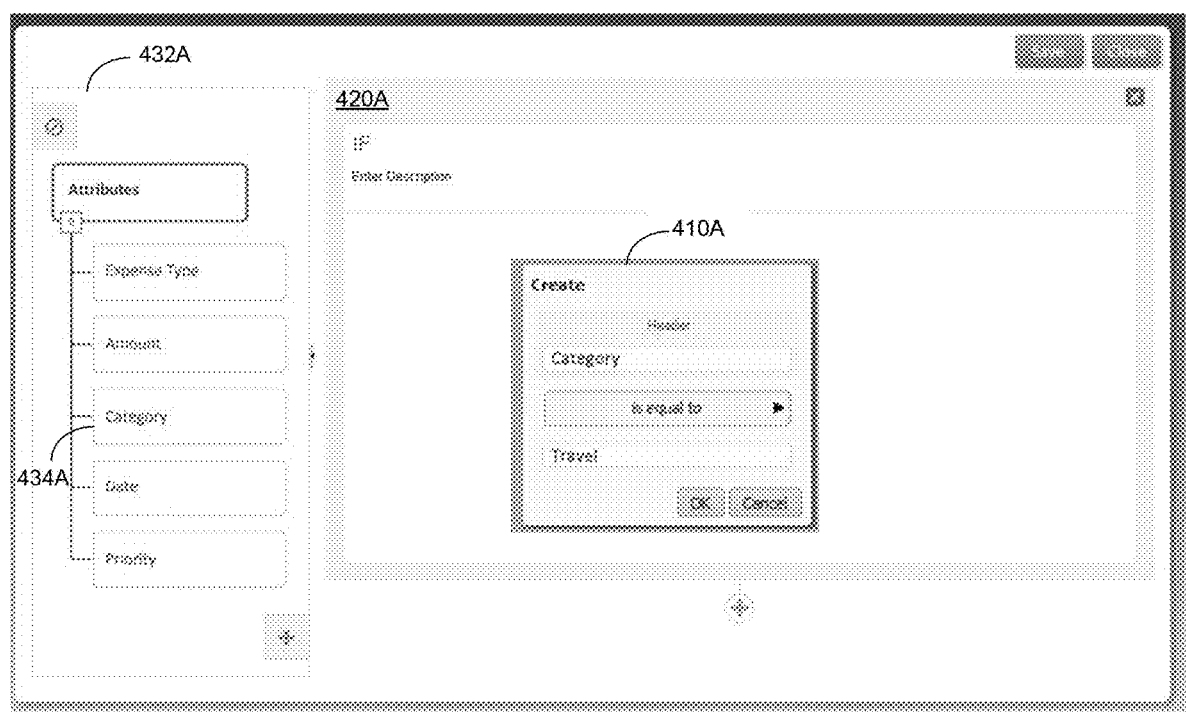
FIG. 4A, FIG. 4B, FIG. 4C, FIG. 4D, FIG. 4E and FIG. 4F are block diagrams that depict exemplary steps for creating one or more new business rules using a visual information builder user interface, according to an embodiment.

Turning to FIG. 4A, FIG. 4A includes template 410A, node 420A, and business rules model tree 432A. Business rules model tree 432A includes object 434A. FIG. 4A may correspond to view controller 120 from FIG. 1, wherein region 184 pertains to tasks for business procurement and financials. Thus, business rules model tree 432A may correspond to business rules model tree 132 from FIG. 1.

The user may first add an empty node 420A, corresponding to a condition or IF clause. Initially, empty node 420A may be shown only as small untitled conditional box. To examine the actual template for setting the various options of the conditional box, the user may expand node 220A to fill the user interface as shown in FIG. 4A. After expanding node 220A, business rules model tree 432A may be updated to show the valid attributes for adding into template 410A of empty node 420A, as shown in FIG. 4A. Template 410A may be used as a default template for building standard condition or IF clauses. As discussed above, the valid attributes for a given object may be defined as part of business rules model tree 432A. Template 410A shows the building of a condition in the standard "[fact] [condition] [value]" form. Initially, all three fields may be empty. In other embodiments, some or all of the fields may be pre-populated. For example, the [fact] field might be set to "Category" as default.

The user may drag and drop object 434A into template 410A to set the [fact] as "Category", use a drop-down menu to select the [condition] as being "is equal to", and type or select "Travel" as the [value]. Thus, node 420A defines a condition that will only match to expense reports categorized as Travel.

Figure 4B:
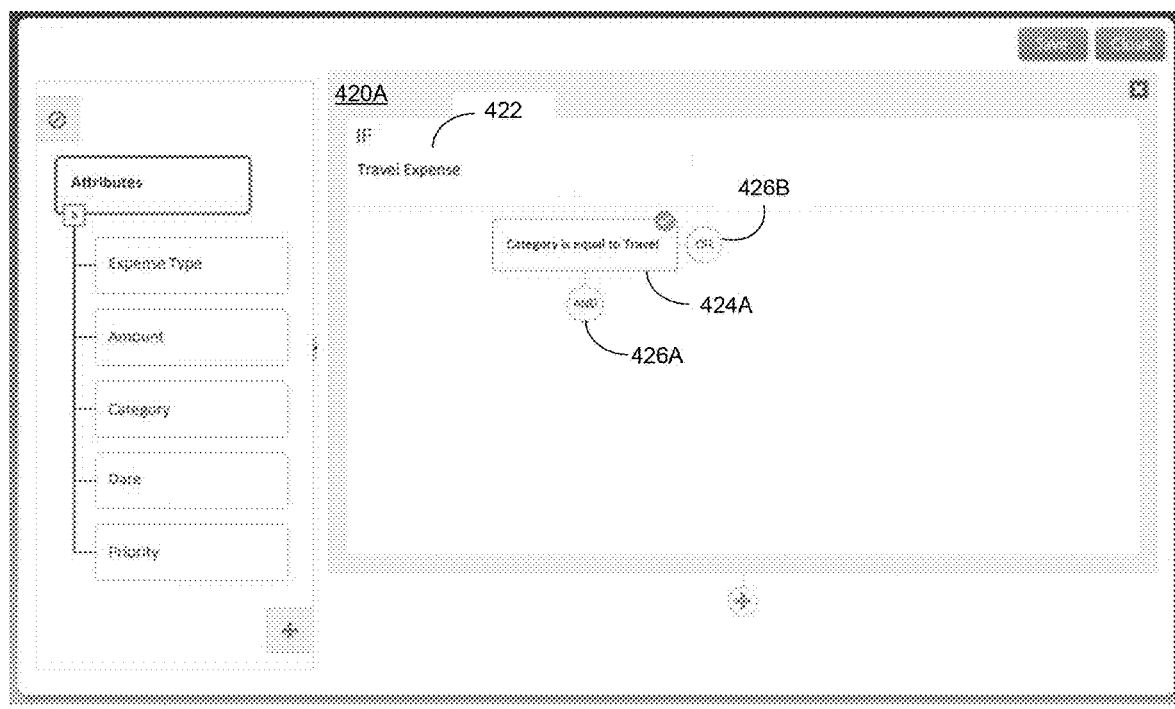

Next, FIG. 4B illustrates the state of node 420A after template 410A is completed. FIG. 4B includes node 420A, description 422, block 424A, button 426A, and button 426B. As shown in FIG. 4B, node 220A is given a description 422, or "Travel Expense", and includes block 424A, corresponding to the data from template 410A, or "Category is equal to Travel". The user may add additional AND / OR conditions to node 420A by clicking on buttons 226A and 226B, respectively.

Figure 4C:
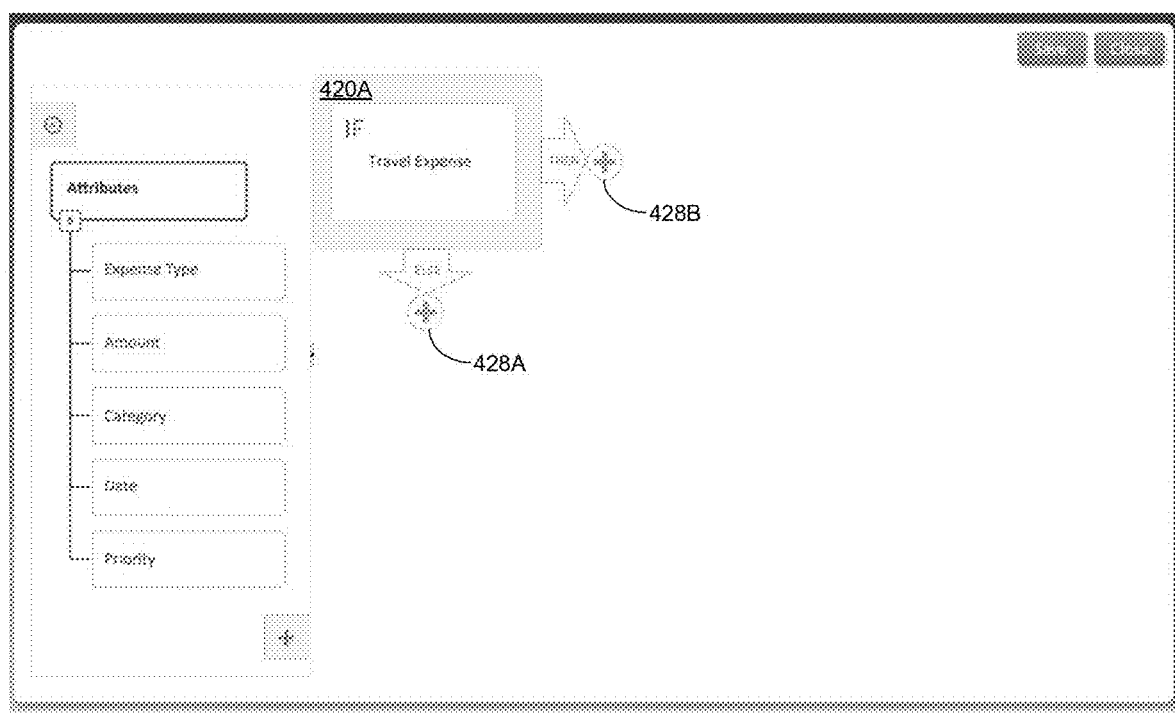

Assuming that no additional conditions were added to node 420A, the user may zoom out the interface as shown in FIG. 4C. FIG. 4C includes node 420A, button 428A, and button 428B. Node 420A is shown in abbreviated form identified only by its description 422 from FIG. 4B, hiding the blocks within from view. The user may add additional THEN/ELSE connectors by clicking on respective buttons 428A and 428B. A new node may also be added to the end of each of the connectors, corresponding to either a condition (IF clause) or an action (DO clause), which may be either selectable by the user or enforced by rules templates of the context metadata.

Figure 4D:
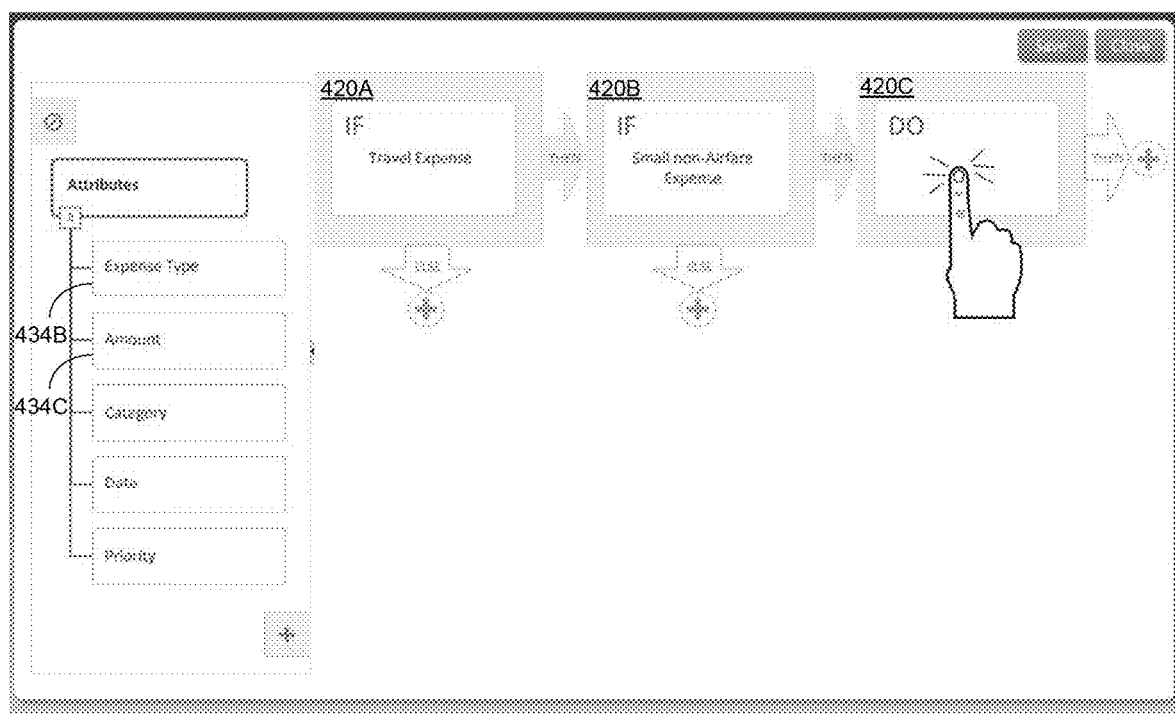

Turning to FIG. 4D, FIG. 4D includes node 420A, node 420B, node 420C, object 434B, and object 434C. Node 420B has been added as a new condition (IF clause) node connected by a THEN connector to the original node 420A. The description of node 420B is "Small non-Airfare Expense". For example, by adding objects 434B and 434C as blocks that are connected by "AND" in node 420B, node 420B can specify that the "Expense Type is not equal to Airfare" and that the "Amount is less than or equal to 500". After adding node 420B, the user may add node 420C as an empty action or DO clause connected by a THEN connector to node 420B. Node 420C may then be clicked to expand node 420C to fill the user interface window.

Figure 4E:
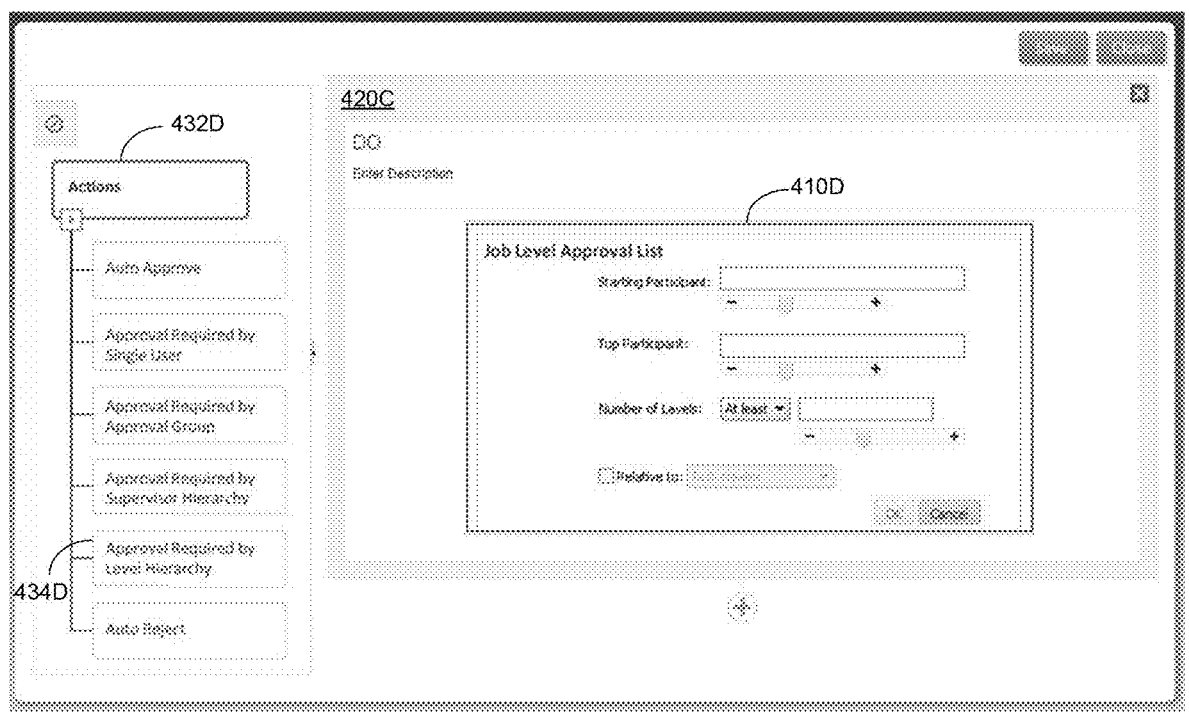

Turning to FIG. 4E, a zoomed view of node 420C is shown. FIG. 4E includes node 420C, template 410D, business rules model tree 432D, and object 434D. Note that the available objects have changed from business rules model tree 432A to business rules model tree 432D. Since node 420C pertains to an action or DO clause, business rules model tree 432D lists the available actions for the current context, or actions related to business procurement and financials, including expense report actions such as "Auto Approve", "Approval Required by Single User", "Approval Required by Approval Group", "Approval Required by Supervisor Hierarchy", "Approval Required by Level Hierarchy" (Object 134D), and "Auto Reject".

The user may select object 434D, or "Approval Required by Level Hierarchy", to drag and drop into node 420C. Accordingly, template 410D may appear, allowing the user to specify the number of approval levels required and the specific participants, which may be specified in absolute terms or relative to the position or role of the task creator.

Figure 4F:
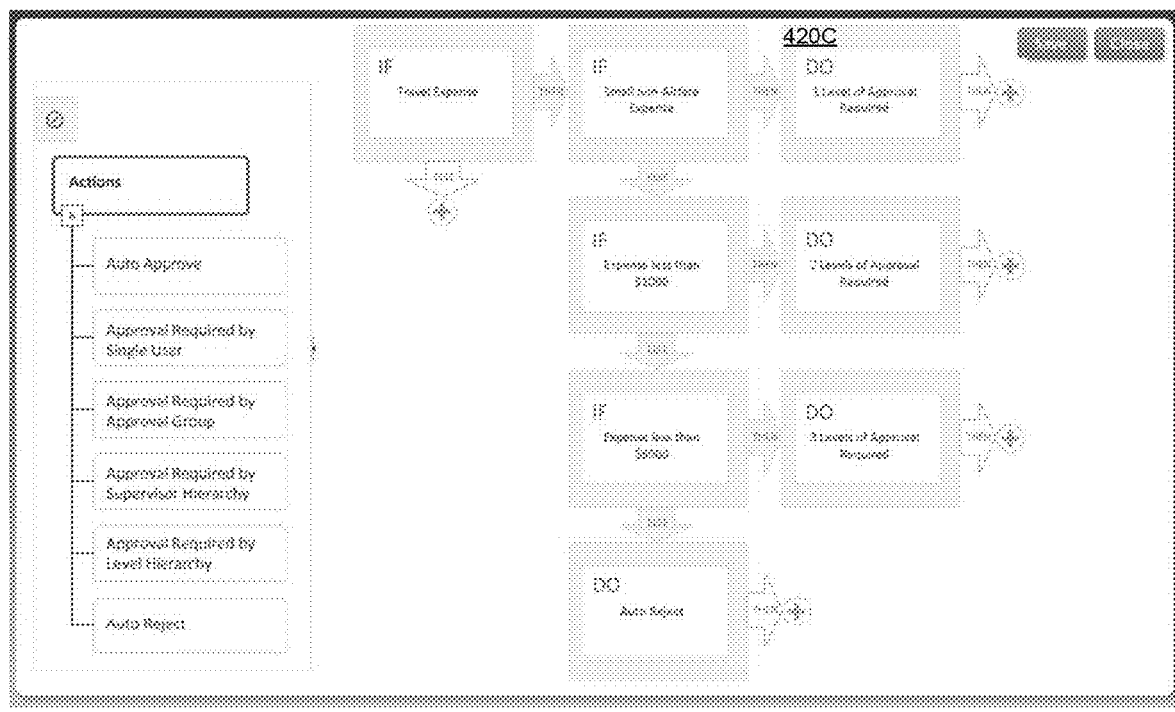

Turning to FIG. 4F, FIG. 4F includes node 420C and logical combination 436. The completed node 420C is shown with the description "1 Level of Approval Required". Thus, for example, the "Number of Levels" option in template 410D may have been set to the value of "At least 1". As shown in FIG. 4F, the user may continue to add additional links and nodes to complete logical combination 436, which defines the overall logic for the business rule being built. Thus, it can be seen that the complete business rule is for the approval of a travel expense, wherein small non-airline expenses (as defined above for node 420B) need at least 1 level of approval, expenses less than $1000 need at least 2 levels of approval, expenses less than $5000 need at least 3 levels of approval, and expenses of $5000 or more are automatically rejected without any review.

Converting the Logical Combination to Business Rules

At block 308 of process 300, referring to FIG. 1, logical combination 436 is converted into one or more business rules evaluable by the business rule engine, or OBR 160. Thus, logical combination 436 may be converted into one or more business rules that are evaluable by OBR 160. This may be necessary since OBR 160 may not support a single complicated rule with multiple levels of nesting. For example, OBR 160 may only support a restrictive rule syntax, such as an IF-THEN statement without any ELSE clauses. In this case, logical combination 436 may need to be broken down into an ordered list of individual rule statements. After block 308, logical combination 436 is converted into one or more business rules evaluable by OBR 160.

Figure 5A:
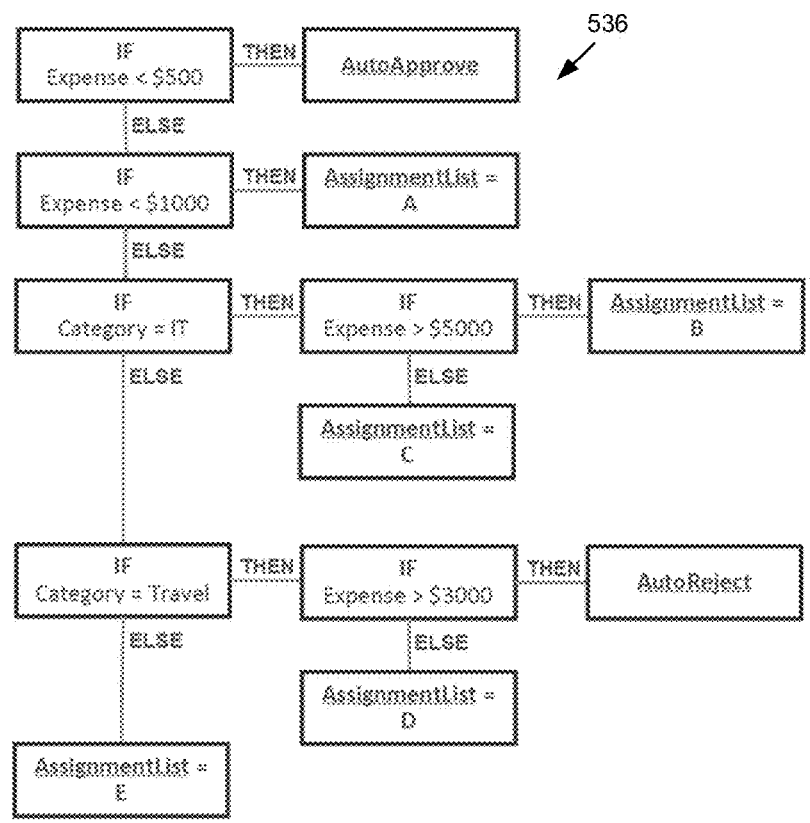
FIG. 5A is a block diagram that depicts an example logical combination in a visual information builder user interface, according to an embodiment.

To provide a more detailed example of the conversion process, FIG. 5A is a block diagram that depicts an example logical combination in a visual information builder user interface, according to an embodiment. Logical combination 536 of FIG. 5A may be built in business rules creator 138 of FIG. 1. As shown in FIG. 5A, logical combination 536 is structured as a decision tree, or tiered and nested IF-THEN-ELSE-DO conditional statements, similar to logical combination 436 in FIG. 4F. Thus, similar to logical combination 436, logical combination 536 may also require conversion into an ordered list of individual conditional statements. An example conversion of logical combination 536 into business rules for OBR 160 is demonstrated below:

IF Expense<$500 THEN AutoApprove
IF Expense>$500 AND Expense<$1000 THEN AssignmentList=A
IF Category=IT AND Expense>$1000 AND Expense<$5000 THEN AssignmentList=B
IF Category=IT AND Expense>$5000 THEN AssignmentList=C
IF Category=Travel AND Expense>$1000 AND Expense<$5000 THEN AssignmentList=D
IF Category=Travel AND Expense>$5000 THEN AutoReject
IF NOT Category=IT AND NOT Category=Travel AND Expense>$1000 THEN AssignmentList=E As shown in FIG. 5A, the conversion can be generated in a relatively straightforward manner by traversing logical combination 536 in order from left to right, top to bottom, wherein each condition after the first condition is connected using AND (for THEN paths) or AND NOT (for ELSE paths) to create a business rule for each decision or action (DO clause). In the example shown in FIG. 5A, the actions include "AutoApprove", "AssignmentList=A", "AssignmentList =B", "AssignmentList=C", "AssignmentList=D", "AssignmentList=E", and "AutoReject". As one may appreciate, by visually building the logic of logical combination 536 in VIB 110 and automating the code conversion of logical combination 536 in block 308, the risk of introducing coding errors into the business rules is greatly reduced by avoiding the laborious and error-prone task of manually building the large chain of IF-THEN statements shown above.

"AssignmentList=E" is a "catch-all" action that occurs when none of the other actions are reached. Note that the "catch-all" decision is conceptually difficult to generate manually, since it depends on combining the negation of all of the other initial conditionals in the decision tree. This conceptual difficulty is entirely avoided by generating the "catch-all" business rule automatically in block 308. Moreover, the automatic generation allows any changes to logical combination 536 to be reflected automatically in the "catch-all" business rule, thereby reducing the chances of introducing coding errors when the business rules need to be modified.

Writing the Business Rules Into a Rule Dictionary for a Rule Engine

At block 310 of process 300, referring to FIG. 1, the one or more business rules converted from block 308 are stored in HWM rule dictionary 164. For example, the user may click on the "Save" button to save the one or more rules, which may then be written into HWM rule dictionary 164 of FIG. 1, since the rules require some level of human intervention in the workflow. If the context of the rule was a standard shipping rule that is automatic, then the rule may instead be saved to rule dictionary 162 of FIG. 1. Since VIB 110 will be aware of the particular context of the business rule according to the metadata passed by Fusion application 170, it can determine the proper interface to use to write the completed rules back to the proper rule dictionary.

While the above example is concerned with building a new rule from scratch, the user may also open and edit existing rules within rule dictionary 162 and HWM rule dictionary 164. For example, after selecting a particular region 184 in view controller 180, all associated existing rules for that context may be shown to the user for potential editing or as a basis for a new rule, or the user may create a new rule from scratch as described above. Accordingly, the user is enabled to design, create, and modify business rules in a visual manner using VIB 110, circumventing the requirement for the user to have a thorough understanding of the specific rule syntax required by OBR 160 for rule dictionary 162 and HWM rule dictionary 164.

Referencing Objects to Specify Attribute Relationships

Figure 5B:
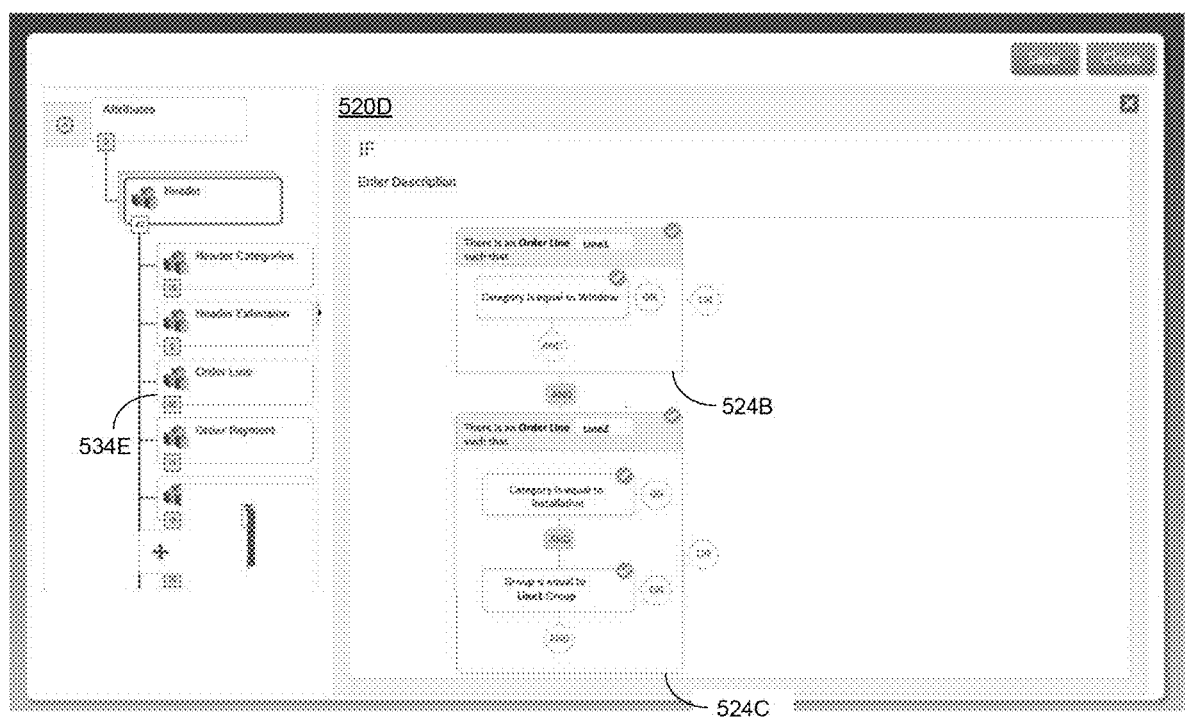
FIG. 5B is a block diagram that depicts a node with named references in a visual information builder user interface, according to an embodiment.

In some contexts, it is desirable to compare and specify attribute relationships between objects. In this case, the template for that context may allow the objects to be abstracted and referenced, as shown in FIG. 5B, a block diagram that depicts a node with named references in a visual information builder user interface, according to an embodiment. FIG. 5B includes node 520D, block 524B, block 524C, and object 534E.

For example, when the user adds object 534E or "Order Line" to node 520D, the resulting block may include a header as shown in blocks 524B and 524C, which allow the "Order Line" object to be abstracted into variables "Line1" and "Line2" for referencing by other blocks. Thus, as shown in block 524C, block 524B is referenced by the name "Line1" in the condition "Group is equal to Line1.Group", or in other words the condition that both blocks 524B and 524C refer to the same "Group". For example, the business may sell both windows and a window installation service. In this case, it may be desirable to define a business rule that will include both the "window" and the "installation" service in the same order or grouping. Thus, node 520D shown in FIG. 5B identifies order lines where the "Windows" and "Installation" are in the same group. Node 520D could be used with an "ELSE" node in a business rule to identify order lines where this is not the case, which may be connected to a DO node that performs some remedial action to preferably group the two order lines together.

Expanding the Logical Combination Based on Relative Placement

Note that in all of the user interfaces illustrated for VIB 110, a consistent logical layout is enforced, wherein expanding along a particular direction or axis corresponds to a specific logical operator, and wherein relative positions indicate order of operations within a larger logical combination. This property is more specifically described in FIG. 3B, a flow diagram that depicts a process for expanding a logical combination based on relative placement, according to an embodiment. Process 320 of FIG. 3B may be carried out on computer system 600 of FIG. 6.

At block 322 of process 320, referring to FIG. 1, view controller 120 is presented to arrange a logical combination of objects. In one example, these objects may correspond to blocks within a node, such as in FIG. 4B and FIG. 5B. In another example, these objects may correspond to nodes, such as in FIG. 4D and FIG. 5A. For the purposes of example, process 320 may first be described using FIG. 4D, and then with FIG. 5B.

At block 324 of process 320, referring to FIG. 4D, a request is received to add a new object that extends a particular direction from an existing object in the logical combination. For example, as shown by the finger tap in FIG. 4D, a request may be received to add a new node 420D that extends to the right from node 420B.

At block 326 of process 320, referring to FIG. 4D, a logical operator of two or more candidate logical operators is determined based on the particular direction from block 324, or right in this case. The two or more candidate logical operators are the logical operators that are valid for the present user interface, or view controller 120 as shown in FIG. 4D. In the interface shown in FIG. 4D, these candidate logical operators correspond to the "THEN" and "ELSE" logical operators. The particular direction may be determined to substantially follow one of a plurality of pathways, which in turn determines the specific logical operator. In one embodiment, the pathways include a horizontal pathway corresponding to a "THEN" logical operator and a vertical pathway corresponding to an "ELSE" logical operator. Since node 420C is placed directly to the right of node 420B, the logical operator may be determined to be "THEN" based on these pathway rules. If the new node was instead requested downwards from node 420B, then the logical operator may be determined to be "ELSE", as indicated by the gray outline. While only two pathways are illustrated in this example, other embodiments may include a larger number of pathways.

At block 328 of process 320, referring to FIG. 4D, the new object, or node 420C, is placed at a particular distance in the particular direction, or to the right, from the existing object, or node 420B. Thus, node 420C may be added to at the position indicated in FIG. 4D. In some embodiments, the particular distance may be configured such that objects auto-arrange in a grid, snap to gridlines, or are otherwise organized for a uniform appearance.

At block 330 of process 320, referring to FIG. 4D, the existing object, or node 420B, is connected to the new object, or node 420C, using the logical operator, or "THEN" as determined in block 326. Thus, the connector arrow labeled "THEN" is added to connect node 420B to node 420C. Thus, the logical combination shown in FIG. 4D expands using node 420C placed to the right of node 420B.

Referring now to FIG. 5B, the objects instead correspond to blocks within a node. Process 320 may proceed in a similar fashion, however the logical operators are "OR" for substantially horizontal and "AND" for substantially vertical. In addition, grouping of objects is shown, which may be used to override a default order of operations. By default, objects may be processed in a left-to-right, then top-to-bottom order, as discussed above in block 308 when converting the logical combination to a corresponding set of business rules. Thus, the direction between the existing node and the new node may define the order of operations for the two nodes. However, this default order of operations may be overridden by grouping blocks together, which may be indicated by a check mark or some other visual indication on each of the grouped blocks.

For example, the blocks within block 524C may be completely evaluated first before being used in the larger logical combination. In addition, since block 524C is treated as a single object in the zoomed out view shown in FIG. 5B, adding a new object will not connect to objects that are inside block 524C, but only to block 524C as a whole. If the desire is to add a new object within block 524C, then block 524C may be selected and expanded to fill the user interface.

Besides adding new objects to the edges of existing objects, new objects may be inserted in-between existing objects, or existing objects may be moved to a new location within the logical combination. In this case, the order of operations may change, new logical operator connections may be formed and broken as necessary depending on the relative positions of the objects in the logical combination, and objects may shift positions.

However, since the user interface follows a specific and consistent logical layout for determining which logical operators to use and the order of operations, a user can readily understand the ramifications of moving a particular object from one position to another by applying the established rules for relative placement, or in this example horizontal (OR) versus vertical (AND) placement, with objects towards the upper-left having higher order of operations priority.

Hardware Summary

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
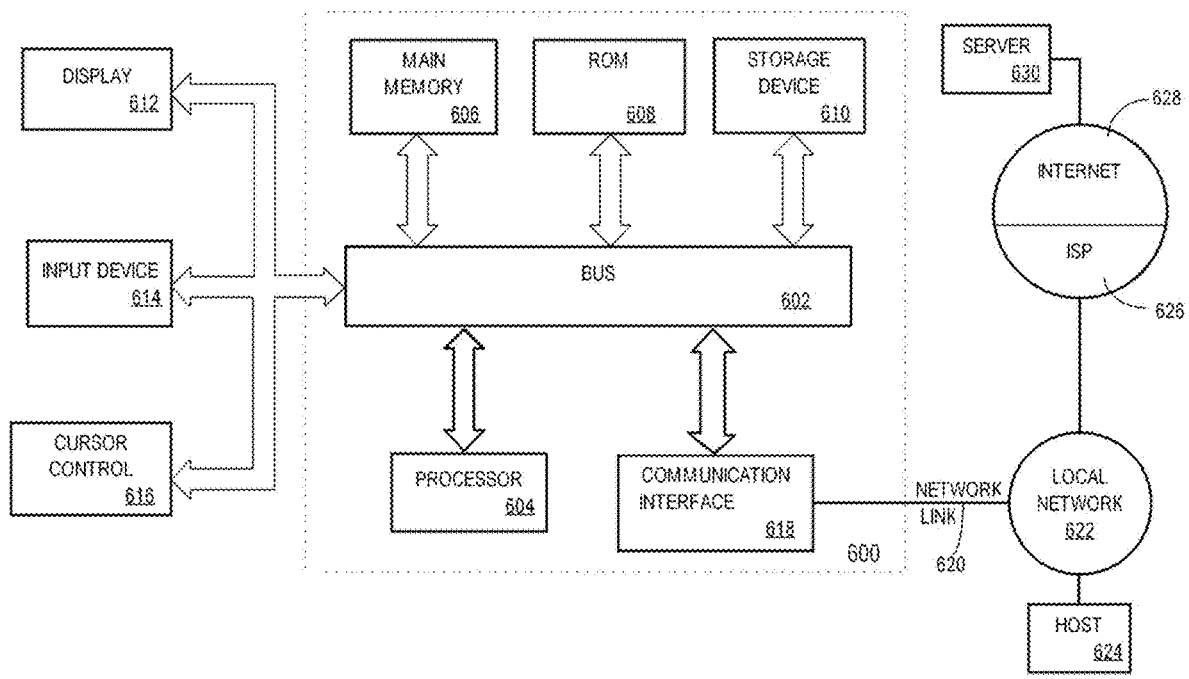
FIG. 6 is a block diagram of a computer system on which embodiments may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    receiving an indication of a particular rule to create or edit;
    retrieving, based on the indication, a rule template that identifies a subset of valid objects for said particular rule of a plurality of available objects;
    presenting, based on the rule template, a user interface on a display screen to arrange a logical combination of objects that represent actions and conditions that are processed during execution of said particular rule by a rules engine;
    placing, in the logical combination: a first object, and a second object connected in a first direction from the first object;
    receiving a request from an input device to add a new object that extends a second direction from the first object in the logical combination, wherein the new object is selected from said subset of valid objects that is identified by said rule template;
    placing the new object in the second direction from the first object, wherein the second direction defines a default order of operations to cause execution of the first object and the new object before execution of the second object;
    connecting the first object to the new object;
    grouping the first object and the second object to override said default order of operations to cause execution of the first object and the second object before execution of the new object;
    performing one selected from the group consisting of:
    executing said particular rule by said rules engine,
    storing, or execution, said particular rule by said rules engine, and
    sending, for execution, said particular rule by said rules engine;
    wherein the method is performed by one or more computing devices.

2. The method of claim 1, further comprising determining a logical operator based on whether the second direction substantially follows one of a plurality of pathways.

3. The method of claim 2, wherein the plurality of pathways include a horizontal pathway and a vertical pathway.

4. The method of claim 1, further comprising determining a logical operator of two or more candidate logical operators, including an AND logical operator and an OR logical operator.

5. A non-transitory computer-readable medium storing instructions which, when executed by one or more processors, cause:
    receiving an indication of a particular rule to create or edit;
    retrieving, based on the indication, a rule template that identifies a subset of valid objects for said particular rule of a plurality of available objects;
    presenting, based on the rule template, a user interface on a display screen to arrange a logical combination of objects that represent actions and conditions that are processed during execution of said particular rule by a rules engine;
    placing, in the logical combination: a first object, and a second object connected in a first direction from the first object;
    receiving a request from an input device to add a new object that extends a second direction from the first object in the logical combination, wherein the new object is selected from said subset of valid objects that is identified by said rule template;
    placing the new object in the second direction from the first object, wherein the second direction defines a default order of operations to cause execution of the first object and the new object before execution of the second object;
connecting the first object to the new object;
grouping the first object and the second object to override said default order of operations to cause execution of the first object and the second object before execution of the new object;
performing one selected from the group consisting of:
executing, said particular rule by said rules engine,
storing, for execution, said particular rule by said rules engine, and
sending, for execution, said particular rule by said rules engine.

6. The non-transitory computer-readable medium of claim 5, wherein the instructions further cause determining a logical operator based on whether the second direction substantially follows one of a plurality of pathways.

7. The non-transitory computer-readable medium of claim 6, wherein the plurality of pathways include a horizontal pathway and a vertical pathway.

8. The non-transitory computer-readable medium of claim 5, wherein the instructions further cause determining a logical operator of two or more candidate logical operators, including an AND logical operator and an OR logical operator.

9. A system comprising one or more computing devices configured to:
receive an indication of a particular rule to create or edit;
retrieve, based on the indication, a rule template that identifies a subset of valid objects for said particular rule of a plurality of available objects;
present, based on the rule template, a user interface on a display screen to arrange a logical combination of objects that represent actions and conditions that are processed during execution of said particular rule by a rules engine;
place, in the logical combination: a first object, and a second object connected in a first direction from the first object;
receive a request from an input device to add a new object that extends a second direction from the first object in the logical combination, wherein the new object is selected from said subset of valid objects that is identified by said rule template;
place the new object in the second direction from the first object, wherein the second direction defines a default order of operations to cause execution of the first object and the new object before execution of the second object;
connect the first object to the new object;
group the first object and the second object to override said default order of operations to cause execution of the first object and the second object before execution of the new object;
performing one selected from the group consisting of:
executing, said particular rule by said rules engine,
storing, for execution, said particular rule by said rules engine, and
sending, for execution, said particular rule by said rules engine.

10. The system of claim 9, wherein the one or more computing devices is configured to determine a logical operator based on whether the second direction substantially follows one of a plurality of pathways.

11. The system of claim 10, wherein the plurality of pathways include a horizontal pathway and a vertical pathway.

12. The system of claim 9, wherein the one or more computing devices is configured to determine a logical operator of two or more candidate logical operators, including an AND logical operator and an OR logical operator.

13. The method of claim 1 wherein:
said placing the new object in the second direction from the first object comprises placing the new object outside of the first object;
the method further comprises placing a second new object inside of the first object.

14. The method of claim 1 wherein said override said default order of operations comprises visually marking the first object and the new object as grouped.

* * * * *

UNITED STATES PATENT AND TRADEMARK OFFICE
CERTIFICATE OF CORRECTION

PATENT NO. : 10,867,273 B2
APPLICATION NO. : 14/604638
DATED : December 15, 2020
INVENTOR(S) : Graham et al.

Page 1 of 1

It is certified that error appears in the above-identified patent and that said Letters Patent is hereby corrected as shown below:

In the Claims

In Column 17, Line 10, in Claim 5, delete "executing," and insert -- executing --, therefor.

In Column 18, Line 15, in Claim 9, delete "executing," and insert -- executing --, therefor.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*